(12) United States Patent
Tanabe et al.

(10) Patent No.: US 6,187,381 B1
(45) Date of Patent: Feb. 13, 2001

(54) PROCESS FOR PREPARING SILICA GEL AND PROCESS FOR PRODUCING DEHUMIDIFYING ELEMENT

(75) Inventors: Jun Tanabe, Yokohama; Yumiko Furuya, Sagamihara, both of (JP)

(73) Assignee: Nichias Corporation, Tokyo (JP)

(*) Notice: Under 35 U.S.C. 154(b), the term of this patent shall be extended for 0 days.

(21) Appl. No.: 09/098,950

(22) Filed: Jun. 17, 1998

(30) Foreign Application Priority Data

Jun. 17, 1997 (JP) .................................................... 9-159886

(51) Int. Cl.$^7$ ........................................................ B05D 3/04
(52) U.S. Cl. ...................... 427/344; 427/230; 427/430.1; 427/297.8; 65/17.2; 65/395; 428/149; 428/116; 428/117; 428/331; 428/446; 264/136; 264/257; 264/287
(58) Field of Search ................. 65/17.2, 395; 427/397.8, 427/344, 230, 430.1; 428/149, 116, 117, 331, 446; 156/184, 208; 252/313.2, 315.01; 264/453, 136, 257, 287

(56) References Cited

U.S. PATENT DOCUMENTS

| | | | | |
|---|---|---|---|---|
| 2,243,296 | * | 5/1941 | Sweetland | 210/204 |
| 2,698,062 | | 12/1954 | Veltman | 502/405 |
| 3,499,812 | | 3/1970 | Glav | 427/344 |
| 3,650,977 | * | 3/1972 | Bobb | 252/313 |
| 4,112,032 | * | 9/1978 | Blaszyk et al. | 264/42 |
| 5,254,195 | * | 10/1993 | Tseng et al. | 156/184 |
| 5,753,345 | * | 5/1998 | Kuma et al. | 428/143 |

OTHER PUBLICATIONS

Patent Abstracts of Japan vol. 013, No. 011 (C–558), Jan. 11, 1989 & JP 63 218235 A (Nichias Corp), Sep. 12, 1988.

Patent Abstracts of Japan vol. 010, No. 280 (C–374), Sep. 24, 1986 & JP 61 101228 A (SEIBU GIKEN: KK; OTHERS: 01), May 20, 1986.

* cited by examiner

Primary Examiner—James Derrington
(74) Attorney, Agent, or Firm—Pillsbury Madison & Sutro

(57) ABSTRACT

A process for preparing silica gel is disclosed. The silica gel is produced by immersing a base in silica sol, drying the impregnated base in a mixed solution of an alkali silicate and an alkali hydroxide, removing the impregnated base form the mixed solution, heating the impregnated base, and subsequently treating the impregnated base with an acid. A sufficient amount of silica gel for use as a dehumidifying element can be produced through a single series of treatments.

3 Claims, No Drawings

PROCESS FOR PREPARING SILICA GEL AND PROCESS FOR PRODUCING DEHUMIDIFYING ELEMENT

FIELD OF THE INVENTION

This invention relates to a process for preparing silica gel and a process for producing a dehumidifying element. More particularly, it relates to a method for supporting silica gel on an appropriate base and a process for producing a dehumidifying element comprising a honeycomb structure made of inorganic fiber paper having silica gel supported thereon.

BACKGROUND OF THE INVENTION

A dehumidifying element composed of a honeycomb structure with silica gel supported thereon has conventionally been produced by a process comprising immersing a honeycomb structure fabricated of inorganic fiber paper, such as glass paper and ceramic paper, in an aqueous alkali silicate solution, immersing the impregnated honeycomb structure in an aqueous solution of a water-soluble calcium salt or magnesium salt, followed by acid treatment (hereinafter called a first conventional process) or a process comprising repeating the steps of immersing the honeycomb structure in an aqueous alkali silicate solution and drying several times, immersing the impregnated honeycomb structure in an aqueous solution of a water-soluble calcium salt or magnesium salt, followed by acid treatment (hereinafter called a second conventional process).

Silica gel production by acid treatment of an alkali silicate is complicated and involves repetition of steps, and it has been desired to obtain silica gel through a single series of steps. According to the first conventional process, because the pick-up of the alkali silicate per single impregnation operation is limited, the above-described steps must be repeated until a sufficient amount of silica gel is built up for obtaining practical dehumidifying performance. The amount of silica gel produced could be increased by increasing the concentration of the alkali silicate solution. However, since an alkali silicate is highly viscous, the inorganic fiber paper would be clogged in a high concentration alkali silicate solution. Therefore, there is an upper limit of the alkali silicate concentration, and the steps should be repeated of necessity.

Where the second conventional process if followed, when an alkali silicate-impregnated honeycomb structure is again immersed in an alkali silicate aqueous solution, the previously supported alkali silicate partly dissolves in the immersing solution, resulting in poor production efficiency.

In the present situation, it is difficult to obtain a sufficient amount of silica gel for manifestation of practical dehumidifying performance through one series of steps.

SUMMARY OF THE INVENTION

An object of the present invention is to provide a process for preparing silica gel through a single series of treatments in a markedly higher yield than in conventional processes.

Another object of the present invention is to provide a process for producing a dehumidifying element having a sufficient amount of silica gel for practical use through a single series of treatments.

The above objects are accomplished by:
(1) A process for preparing silica gel comprising the steps of:
immersing a base in silica gel (hereinafter referred to as a first immersion step),
drying the impregnated base,
immersing the dried impregnated base in a mixed solution of an alkali silicate and an alkali hydroxide (hereinafter referred to as a second immersion step),
heating the impregnated base taken out of the mixed solution, and
treating the heated base with an acid.
(2) A process for producing a dehumidifying element comprising the steps of:
processing inorganic fiber paper into a honeycomb structure,
immersing the honeycomb structure in silica sol (first immersion step),
drying the impregnated honeycomb structure,
immersing the dried impregnated honeycomb structure in a mixed solution of an alkali silicate and an alkali hydroxide (second immersion step),
heating the impregnated honeycomb structure taken out of the mixed solution, and
treating the heated honeycomb structure with an acid.
(3) A process for producing a dehumidifying element comprising the steps of:
immersing inorganic fiber paper in silica sol (first immersion step),
drying the impregnated inorganic fiber paper,
immersing the dried impregnated inorganic fiber paper in a mixed solution of an alkali silicate and an alkali hydroxide (second immersion step),
processing the impregnated inorganic fiber paper taken out of the mixed solution into a honeycomb structure,
heating the honeycomb structure, and
treating the heated honeycomb structure with an acid.

According to the present invention, the first immersion step and the drying step provide a base or inorganic fiber paper retaining a large amount of solidified silica sol, which is converted to silica gel through the subsequent series of treatments while being supported on the base or inorganic fiber paper. That is, a large amount of silica gel can be supported on a base or inorganic fiber paper through a single series of treatments.

DETAILED DESCRIPTION OF THE INVENTION

Inorganic fiber paper which has been or will be formed into a honeycomb structure is immersed in silica sol to hold silica sol in the individual fibers.

The inorganic fiber paper can be made of glass fiber or ceramic fiber. In order to prevent deterioration of silica gel, glass fiber with less alkali content such as E glass fiber and aluminosilicate fiber are preferred.

Silica sol is a solution in which silica particles are dispersed in a solvent. The silica particles preferably have a particle size of 50 nm or smaller for easy dissolution in a mixed alkali solution of an alkali silicate and an alkali hydroxide hereinafter described. Such silica sol is available on the market under trade names of Snowtex XS, S, N or O, manufactured by Nissan Chemical Industries, Ltd.

Silica sol easily penetrates into the interstices among the inorganic fiber paper. Therefore, on immersing the inorganic fiber paper in silica sol, a large quantity of silica is retained in the interstices in the form of gel.

The silica sol-impregnated inorganic fiber paper is dried to obtain solidified silica sol. Aiming at removing any residual water content from the inorganic fiber paper and fixing silica to the paper, the drying step is carried out by applying hot air to the inorganic fiber paper or by the use of an electric heater. A suitable drying temperature is 100 to 200° C.

The impregnated and dried inorganic fiber paper is then immersed in a mixed solution of an alkali hydroxide and an alkali silicate to pick up the alkali hydroxide-alkali silicate mixture. The reason of using an alkali hydroxide besides alkali silicate in this second immersion step is that an alkali component should be present in this stage in a high proportion so as to secure satisfactory dehumidifying performance. If the molar ratio of silicon oxide to an alkali oxide component exceeds 10, the resulting silica gel will have a small specific surface area, failing to exhibit satisfactory performance.

The mixed alkali solution is a mixture of an alkali silicate aqueous solution, an alkali hydroxide aqueous solution, and water. The alkali silicate includes sodium silicate and potassium silicate. The alkali silicate aqueous solution preferably has a concentration of 20 to 35 wt % (% by weight). The alkali hydroxide includes sodium hydroxide and potassium hydroxide. The alkali hydroxide aqueous solution preferably has a concentration of 20 to 50 wt %. While the concentrations of the alkali silicate and the alkali hydroxide in the mixed solution are not particularly limited, it should be noted that, if the concentrations of the two solutions are higher than the above respective ranges, they hardly mix together. If the concentrations of the two solutes in the mixed alkali solution are too low, the amount of silica gel obtained through a single series of treatments is reduced.

In using sodium hydroxide as an alkali hydroxide, either solid sodium hydroxide or a 48 wt % aqueous solution can be used in the preparation of the mixed alkali solution.

The immersion time is decided appropriately according to a finally desired amount of silica gel to be produced. If the immersion time is too long, the solidified silica sol that has been fixed to the inorganic fiber paper dissolves in the mixed alkali solution. If the immersion time is too short, a desired amount of silica gel cannot be obtained. A dehumidifying element is in practice required to have at least about 80 kg/m$^3$ of silica gel. In order to secure that amount, the immersed time is preferably several minutes to several tens of minutes. The second immersion step as well as the first immersion step can be conducted at room temperature (approximately from 10 to 40° C.).

The mixed alkali solution is preferably adhered to the inorganic fiber paper in such an amount that the molar ratio of silicon oxide to an alkali oxide component is 10 or less and the amount of silica gel obtained finally is 80 kg/m$^3$ or more. The lower limit of the molar ratio of silicon oxide to an alkali oxide component is preferably 0.5.

The molar ratio of silicon oxide ($SiO_2$) to an alkali oxide component ($Na_2O$, $K_2O$, etc.) can be calculated from (1) the amount of silicon oxide, which is derived from the amount of silica sol adhered to an inorganic fiber paper in the first immersion step and the amount of a mixed solution of an alkali silicate and an alkali hydroxide adhered in the second immersion step, and (2) the amount of an alkali oxide component which is derived from the amount of a mixed solution of an alkali silicate and an alkali hydroxide adhered in the second immersion step. In this calculation, the amounts of alkali silicate and alkali hydroxide in the mixed solution adhered are converted into the amounts of silicon oxide and alkali oxide in terms of the amount of Si and alkali element, respectively.

After the second immersion step, the inorganic fiber paper is taken out of the immersion bath and heated, whereby the solidified silica sol in the inorganic fiber paper dissolves in the mixed alkali solution adhered to the inorganic fiber paper and converted into an alkali silicate. Heating accelerates the dissolution.

The heating temperature ranges from 30 to 90° C. At temperatures higher than 90° C., the silicic acid gel forming reaction induced by the subsequent acid treatment becomes slow, failing to produce satisfactory silica gel under normal conditions. At temperatures lower than 30° C. silica sol does not dissolve in the mixed alkali solution.

The heating time is from 15 minutes to 2 hours. Heating is usually carried out by passing heated air through the flutes of a honeycomb structure made of the inorganic fiber paper. If the heating time is shorter than 15 minutes, there would be a temperature difference between the air inlet side and the outlet side of the honeycomb structure, failing to heat the structure uniformly. It follows that the dissolution of silica sol is insufficient in the air outlet part. Heating for more than 2 hours causes no further change, merely drying the inorganic fiber paper.

The heating can be carried out by heat application by means of a heater. Where the inorganic fiber paper has been made into a honeycomb structure before heating, heating is preferably conducted by passing heated air through the flutes.

If desired, the impregnated and heated inorganic fiber paper is immersed in an aqueous solution of water-soluble calcium or magnesium salt, such as calcium chloride, magnesium chloride or magnesium nitrate. By this immersion treatment the alkali silicate on the inorganic fiber paper is converted to insoluble calcium or magnesium silicate and thus fixed. A preferred concentration of the salt solution is several to about 30 wt %, and a preferred immersion temperature is room temperature up to 70° C. The immersion time is usually about 10 minutes or longer. If the immersion treatment is insufficient, an unreacted alkali silicate remains. Although the residual alkali silicate is converted to silicic acid gel in the subsequent acid treatment, it is instable and tends to partly fall off the inorganic fiber paper, resulting in defects in the final product.

The inorganic fiber paper is then immersed in an aqueous solution of an acid or an acidic salt capable of converting the silicate into silicic acid gel. Useful acids include hydrochloric acid, nitric acid, and sulfuric acid. Organic acids are also employable. Useful acidic salts include ammonium chloride and ammonium nitrate. In this acid treatment most of calcium or magnesium ions in the form of calcium silicate or magnesium silicate dissolve in the acid solution.

The acid treated inorganic fiber paper is washed with water to remove any remaining salts and dried in hot air. Where the inorganic fiber paper contains organic fiber or organic binders, such as organic matter can be burnt up, if necessary, by elevating the temperature to about 400 to 500° C. simultaneously with or after the drying.

Processing of the inorganic fiber paper into a honeycomb structure can be carried out either before or during the above-mentioned series of treatments. That is, the inorganic fiber paper is first made into a honeycomb structure and then subjected to the series of treatments, or the inorganic fiber paper can be treated as such till the second immersion step and made into a honeycomb structure prior to the acid treatment. In the latter case, a roll of inorganic fiber paper of continuous length is continuously transported up to the second immersion stage by means of a transporting roller, which is of advantage for production efficiency. This is also advantageous for maintenance of the honeycomb appearance because it is only in the acid treatment that the inorganic fiber paper has the form of a honeycomb structure.

The method for fabricating a honeycomb structure is not particularly restricted. For example, inorganic fiber paper is shaped into single-corrugated paper having given pitch and height, and a plurality of cut sheets of the corrugated paper are laminated to a desired thickness to obtain a honeycomb block, or the single-corrugated paper is wounded around a core to make a honeycomb structure.

There is thus produced a dehumidifying element. According to the process of the present invention, the amount of silica gel required for practical use can be obtained through a single series of processing treatments, which is of great advantage for production efficiency.

While the present invention has been described with particular reference to the production of a dehumidifying element, the present invention provides a variety of silica gel articles by replacing the inorganic fiber paper with other appropriate bases, such as nonwoven fabric made of organic or inorganic fiber, braid made of polyamide fiber (e.g., Kevlar fiber), and the like.

The present invention will now be illustrated in greater detail with reference to Examples, but it should be understood that the present invention is not construed as being limited thereto. Unless otherwise noted, all the parts and percents are by weight.

EXAMPLE

Paper made of E glass fiber and talc (filler) and having a thickness of 0.2 mm and a basis weight of 90 g/m² was corrugated and rolled up into a honeycomb wheel structure. The honeycomb wheel structure was impregnated with silica sol (Snowtex 30) and dried to have adhered thereto 60 kg/m³ of solidified silica sol.

The impregnated and dried honeycomb structure was immersed in a mixed solution, prepared from 100 parts of a sodium silicate aqueous solution ($SiO_2/Na_2O=2.1$ by molar ratio) having a concentration of 42 wt %, 40 parts of a 48 wt % aqueous solution of sodium hydroxide, and 71 part of water, for 30 minutes to pick up 250 kg/m³ of the mixed solution, followed by heating by passing air at 50° C. for 30 minutes. The $SiO_2/Na_2O$ molar ratio in the solidified silica sol, sodium silicate, and sodium hydroxide was 2.7.

The honeycomb structure was further immersed in a 10 wt % aqueous calcium chloride solution at 50° C. for 30 minutes and then in a 5 wt % hydrochloric acid aqueous solution for 30 minutes. After taking out of the acid bath, the honeycomb structure was washed with water, dried at 100° C., and fire at 400° C. to obtain a dehumidifying element.

The physical properties of the resulting dehumidifying element are shown in Table 1 below. The dehumidifying performance of the element as integrated into a reusable rotary dehumidifier is shown in Table 2 below.

COMPARATIVE EXAMPLE

For comparison, a dehumidifying element was prepared in accordance with a conventional process for silica gel production.

The same honeycomb structure as used in Example 1 was immersed in a sodium silicate aqueous solution ($SiO_2/Na_2O=2.1$ by molar ratio) having a concentration of 42 wt % for 30 minutes. After draining and air blowing, the impregnated honeycomb structure was immersed in a 10 wt % aqueous solution of calcium chloride at 50° C. for 30 minutes and then in 5 wt % hydrochloric acid at room temperature for 30 minutes. The honeycomb structure taken out of the acid bath was washed with water, dried at 100° C., and fired at 400° C. to remove any organic matter.

The resulting honeycomb structure having silica gel supported thereon was subjected to the same treatments from alkali silicate immersion to drying three times to obtain a dehumidifying element.

The physical properties of the resulting dehumidifying element are shown in Table 1. The dehumidifying performance of the element as integrated into a reusable rotary dehumidifier is shown in Table 2.

TABLE 1

| Dehumidifying Element | Example | Compara. Example |
|---|---|---|
| Density[1] (kg/m³) | 242 | 252 |
| Amount of silica gel[2] (kg/m³) | 98 | 102 |
| Specific surface area[3] (m²/g) | 206 | 202 |
| Moisture absorption[4] (wt %): | | |
| 90% RH | 31 | 16.5 |
| 50% RH | 17 | 12.3 |
| 20% RH | 8 | 7.8 |

Note:
[1] the weight of the element per unit volume
[2] the weight of silica gel per unit volume of the element
[3] the surface area of the element per unit weight of the element
[4] the equilibrium adsorption amount of moisture per unit weight of the element under the respective relative humidities

TABLE 2

| Performance of Dehumidifier | | | |
|---|---|---|---|
| Inlet temperature (° C.) | 30 | 30 | 30 |
| Inlet absolute humidity (g/kg) | 20 | 12 | 6 |
| Outlet absolute humidity (g/kg) | | | |
| Example | 12.8 | 5.7 | 2.5 |
| Compara. Example | 13.0 | 6.9 | 2.7 |

As is apparent from the results in Table 1, while the dehumidifying element of the present invention is produced through a single series of treatments, it has supported thereon substantially the same quantity of silica gel as the comparative one. Besides, as can be seen from Table 2, the dehumidifying element of the invention is superior to the comparative one in dehumidifying performance.

While the invention has been described in detail and with reference to specific examples thereof, it will be apparent to one skilled in the art that various changes and modifications can be made therein without departing from the spirit and scope thereof.

What is claimed is:

1. A process for preparing a fibrous structure suitable for use as a dehumidification element impregnated with at least about 80 kg/m³ of silica gel, comprising:

initially immersing a fibrous structure in silica sol to form an impregnated structure, drying the resulting impregnated structure, immersing the dried impregnated structure in a mixed solution of an alkali silicate solution and an alkali hydroxide solution, said alkali silicate solution having an alkali silicate content of 20 to 35 wt % and said alkali hydroxide solution having an alkali hydroxide content of 20 to 50 wt %, wherein the molar ratio of silicon oxide to alkali oxide is adjusted so that it does not exceed 10, removing the impregnated structure from the mixed solution, heating the impregnated structure removed from the mixed solution at from 30–90° C. for at least 15 minutes, and thereafter treating the resulting structure with an aqueous acid solution, and subsequently drying the thus treated structure.

2. A process for producing a honeycomb fibrous structure dehumidifying element impregnated with a least about 80 Kg/m$^3$ of silica gel, comprising:

processing inorganic fiber paper into a honeycomb structure, initially immersing the honeycomb structure in silica sol, to form an impregnated honeycomb structure, drying the resulting impregnated honeycomb structure, immersing the dried impregnated honeycomb structure in a mixed solution of an alkali silicate solution and an alkali hydroxide solution, said alkali silicate solution having an alkali silicate content of 20 to 35 wt % and said alkali hydroxide solution having an alkali hydroxide content of 20 to 50 wt %, wherein the ratio of silicon oxide to alkali oxide is adjusted so that it does not exceed 10, removing the impregnated honeycomb structure from the mixed solution, heating the impregnated honeycomb structure removed from the mixed solution at from 30–90° C. for at least 15 minutes, and thereafter treating the resulting honeycomb structure with an aqueous acid solution, and subsequently drying the thus treated honeycomb structure.

3. A process for producing a dehumidifying element impregnated with a least about 80 Kg/m$^3$ of silica gel, comprising:

initially immersing inorganic fiber paper in silica sol, to form an impregnated inorganic fiber paper, drying the resulting impregnated inorganic fiber paper, immersing the dried impregnated inorganic fiber paper in a mixed solution of an alkali silicate solution and an alkali hydroxide solution, said alkali silicate solution having an alkali silicate content of 20 to 35 wt % and said alkali hydroxide solution having an alkali hydroxide content of 20 to 50 wt %, wherein the molar ratio of silicon oxide to alkali oxide is adjusted so it does not exceed 10, removing the impregnated inorganic fiber paper from the mixed solution, processing the resulting impregnated inorganic fiber paper removed from the mixed solution into a honeycomb structure, heating the honeycomb structure at from 30–90° C. for at least 15 minutes, and thereafter treating the resulting honeycomb structure with an aqueous acid solution, and subsequently drying the thus treated honeycomb structure.

* * * * *